United States Patent [19]
Bentley

[11] Patent Number: 4,570,201

[45] Date of Patent: Feb. 11, 1986

[54] CAPACITOR

[75] Inventor: Jeffrey A. Bentley, Riverside, R.I.

[73] Assignee: Aerovox Incorporated, New Bedford, Mass.

[21] Appl. No.: 624,722

[22] Filed: Jun. 26, 1984

[51] Int. Cl.[4] .......................... H01G 4/08; H01G 4/38
[52] U.S. Cl. ..................................... 361/323; 361/328
[58] Field of Search .............. 361/323, 328, 329, 330; 29/25.42

[56] References Cited

U.S. PATENT DOCUMENTS

| | | | |
|---|---|---|---|
| 2,710,441 | 3/1955 | Heyman | 29/25.42 |
| 3,049,651 | 8/1962 | Adelson et al. | 361/323 |
| 3,705,336 | 12/1972 | Kalstein | 361/330 |
| 4,028,595 | 6/1977 | Stockman | 361/328 |
| 4,170,812 | 10/1979 | Rayno | 29/25.42 |
| 4,263,638 | 4/1981 | Stockman et al. | 361/328 |
| 4,352,145 | 9/1982 | Stockman | 361/329 |

FOREIGN PATENT DOCUMENTS 1220083 1/1971 United Kingdom ................ 361/328

*Primary Examiner*—Donald A. Griffin

[57] ABSTRACT

Capacitor comprising a first metallized film electrode, a second metallized film electrode capacitively coupled to, and longer than, the first metallized film electrode, each metallized film electrode having an electrically non-conducting plastic substrate with a metal coating, a metal foil electrode capacitively coupled to the second metallized film electrode in the zone beyond the end of the first metallized film electrode, a first plastic film intermediate the metal foil electrode and the second metallized film electrode, each of its ends extending beyond each end of the metal foil electrode to prevent the edges of the metal foil electrode from penetrating the plastic substrate of the second metallized film electrode, and a second plastic film adjacent to the metal foil electrode on the side opposite the first plastic film to insulate the metal foil electrode from the metal coating.

5 Claims, 1 Drawing Figure

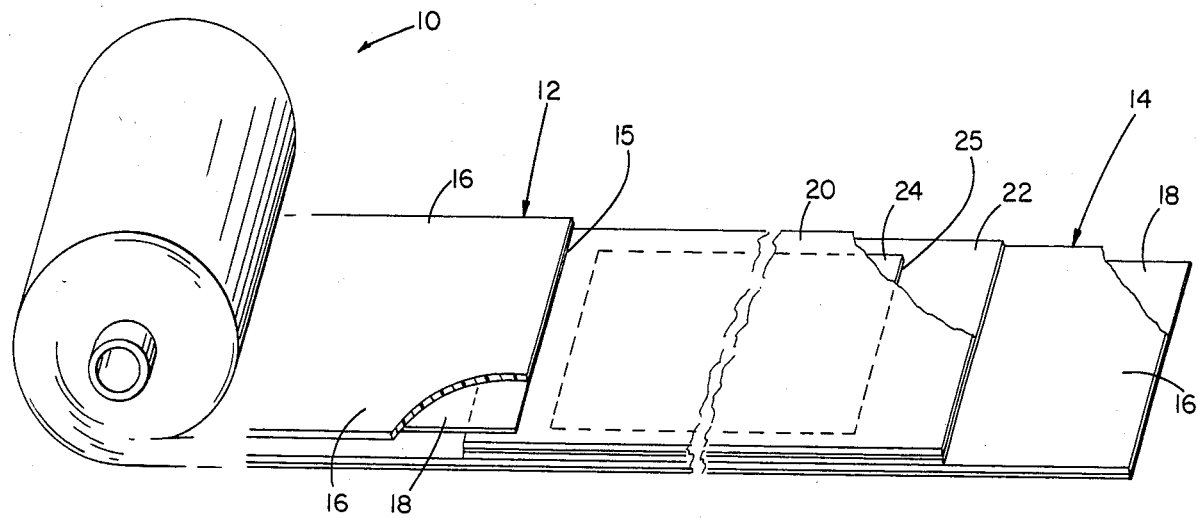

CAPACITOR

BACKGROUND OF THE INVENTION

This invention relates to multiple capacitance capacitors.

In wound multiple capacitance capacitors, two metallized film electrodes are wound together sufficiently to form a capacitor of a desired capacitance, whereupon one of the metallized film electrodes is terminated, a metal foil electrode inserted and winding continued sufficient to form of the metal foil electrode and the common metallized foil electrode a capacitor of a second desired capacitance. Three terminals are secured in contact with, respectively, each electrode. As disclosed in, e.g., Rayno U.S. Pat. No. 4,170,812, an electrically insulating plastic film has been inserted between the metal foil electrode and the metal foil coating of the metallized film electrode in order to electrically insulate the metal surfaces from each other.

SUMMARY OF THE INVENTION

In general, the invention features a capacitor comprising a first metallized film electrode, a second metallized film electrode capacitively coupled to, and longer than, the first metallized film electrode, each metallized film electrode having an electrically non-conducting plastic substrate with a metal coating, a metal foil electrode capacitively coupled to the second metallized film electrode in the zone beyond the end of the first metallized film electrode, a first plastic film intermediate the metal foil electrode and the second metallized film electrode, each of its ends extending beyond each end of the metal foil electrode to prevent the edges of the metal foil electrode from penetrating the plastic substrate of the second metallized film electrode, and a second plastic film adjacent to the metal foil electrode on the side opposite the first plastic film to insulate the metal foil electrode from the metal coating.

In preferred embodiments, the first and second plastic films are polyester, preferably Mylar ®, and are inserted intermediate the first and second metallized film electrodes. The metal foil electrode is aluminum.

Other features and advantages of the invention will be apparent from the following description of the preferred embodiment, and from the claims.

DESCRIPTION OF THE PREFERRED EMBODIMENT

We first briefly describe the drawing.
Drawing
The drawing figure is a partially broken-away perspective view of a partially unwound capacitor in accordance with the preferred embodiment.

Structure and Manufacture

Referring to the drawing, wound capacitor 10 has two metallized film electrodes 12, 14 that overlap so as to be capacitively coupled and laterally offset from each other no less than 1 mm. Each has a polypropylene substrate 16 with a thin coating of aluminum 18 deposited on substrate 16 so as to leave a metal-free margin along its length no less than 1 mm. wide.

Metallized film electrodes 12, 14 are wound together sufficiently to produce a section having a desired capacitance. Metallized film electrode 12 then is terminated at 15 and polyester films 20, 22 are inserted simultaneously, intermediate metallized film electrodes 12, 14, whereupon a predetermined length of polyester films 20, 22 is wound, and aluminum foil electrode 24 is inserted between polyester films 20, 22.

Winding continues until a length of aluminum foil electrode 24 sufficient to form, with metallized film electrode 14, a capacitor of desired capacitance has been wound, whereupon aluminum foil electrode 24 is terminated at 25 and the winding continued sufficiently for polyester films 20, 22 to isolate the end of aluminum foil electrode 24 from metallized film electrode 14, captured between them and terminated short of them. Three terminals (not shown) are secured in contact with, respectively, each electrode in a conventional manner.

Operation

In capacitors of the invention, tough, abrasion resistant polyester film 22 prevents the sharp and burred edges of metal foil electrode 24 from abrading and cutting through polypropylene substrate 16 of metallized film electrode 14, thereby avoiding short circuits and early capacitor failure. Multiple capacitance capacitors embodying the invention are capable of practical and inexpensive manufacture.

Other embodiments are within the following claims.

I claim:

1. A capacitor comprising
   a first metallized film electrode,
   a second metallized film electrode capacitively coupled to, and longer than, said first metallized film electrode, each said metallized film electrode having an electrically non-conducting plastic substrate with a metal coating,
   a metal foil electrode capacitively coupled to said metal coating of said second metallized film electrode in the zone beyond the end of said first metallized film electrode, said metal foil electrode being on the opposite side of said plastic substrate of said second metallized film from said metal coating of said second metallized film,
   a first plastic film intermediate said metal foil electrode and said plastic substrate of said second metallized film electrode, each end thereof extending beyond each end of said metal foil electrode to prevent the edges of said metal foil electrode from penetrating said plastic substrate of said second metallized film electrode, and
   a second plastic film adjacent to said metal foil electrode on the side opposite said first plastic film to insulate said metal foil electrode from said metal coating.

2. The invention of claim 1 wherein said first plastic film is polyester.

3. The invention of claim 1 wherein said first plastic film is inserted intermediate said first and second metallized film electrodes near the end of said first metallized film electrode.

4. The invention of claim 1 wherein said second plastic film is inserted intermediate said first and second metallized film electrodes near the end of said first metallized film electrode.

5. The invention of claim 1 wherein said metal foil electrode is aluminum.

* * * * *